United States Patent [19]
Takizawa et al.

[11] Patent Number: 5,715,732
[45] Date of Patent: Feb. 10, 1998

[54] HARMONIC FLEXIBLE MESHING GEAR DEVICE

[75] Inventors: Noboru Takizawa; Naomi Shirasawa, both of Nagano-ken, Japan

[73] Assignee: Harmonic Drive Systems, Inc., Tokyo, Japan

[21] Appl. No.: 687,492

[22] PCT Filed: Dec. 14, 1995

[86] PCT No.: PCT/JP95/02567

§ 371 Date: Oct. 3, 1996

§ 102(e) Date: Oct. 3, 1996

[87] PCT Pub. No.: WO96/18833

PCT Pub. Date: Jun. 20, 1996

[30] Foreign Application Priority Data

Dec. 14, 1994 [JP] Japan ............... 6-310834
Dec. 14, 1994 [JP] Japan ............... 6-310835

[51] Int. Cl.⁶ ........................................... F16H 1/32
[52] U.S. Cl. ........................................ 74/640; 475/180
[58] Field of Search ........................... 74/640; 475/180

[56] References Cited

U.S. PATENT DOCUMENTS

| | | | |
|---|---|---|---|
| 4,817,457 | 4/1989 | Carlson | 74/640 |
| 5,269,202 | 12/1993 | Kiyosawa et al. | 74/640 |
| 5,282,398 | 2/1994 | Ishikawa | 74/640 |
| 5,388,483 | 2/1995 | Ishida et al. | 74/640 |
| 5,429,556 | 7/1995 | Ishida et al. | 475/180 |
| 5,485,766 | 1/1996 | Ishikawa | 74/640 |
| 5,662,008 | 9/1997 | Aubin et al. | 74/640 |

FOREIGN PATENT DOCUMENTS

| | | |
|---|---|---|
| 2-107856 | 8/1990 | Japan . |
| 3-118346 | 12/1991 | Japan . |
| 6-17888 | 1/1994 | Japan . |

Primary Examiner—Khoi Q. Ta
Assistant Examiner—Peter T. Kwon
Attorney, Agent, or Firm—Burns, Doane, Swecker & Mathis, LLP

[57] ABSTRACT

The silk-hat-shaped flexible external gear (13) of a silk-hat flexible meshing gear device (11) comprises a body (22), a diaphragm (23) and a boss (25). Between the main portion of the body (22) and a curved portion (222) is formed a thinned portion (221) whose thickness is about 80% that of the main portion. The thickness of the diaphragm (23) is defined to be largest at the inner edge (point A), smallest at the middle portion (point B) and slightly smaller than the largest thickness at the outer edge (point C). To make the change in thickness smooth throughout, the contour is defined by use of a group of curved lines (223, 224). Providing the thinned portion (221), and defining the thickness of the diaphragm (23) in the foregoing manner relieves stress concentration at the inner and outer edges and smooths the stress distribution. As a result, the axial length and the outer diameter can be reduced to realize a compact silk-hat flexible meshing gear device.

12 Claims, 4 Drawing Sheets

HARMONIC FLEXIBLE MESHING GEAR DEVICE

TECHNICAL FIELD

This invention relates to a silk-hat flexible meshing gear device including a flexible external gear shaped like a silk hat. More particularly, this invention relates to a silk-hat flexible meshing gear device including a flexible external gear shaped like a silk hat wherein stress concentration in the flexible external gear can be relieved and the flexible external gear can be reduced in outer diameter and axial length.

BACKGROUND ART

A type of flexible meshing gear device with a flexible external gear shaped like a silk hat is known to the art. In this specification, this type of flexible meshing gear device will be referred to as a "silk-hat flexible meshing gear device."

FIG. 6 is a vertical sectional view of the silk-hat-shaped flexible external gear of a silk-hat flexible meshing gear device taken along a plane including the device axis. As shown in this figure, the flexible external gear 1 comprises a cylindrical body 2, an annular diaphragm 3 whose inner edge is continuous with the open proximal end of the body 2, and a thick annular boss 5 continuous with the outer edge of the diaphragm 3. External teeth 4 are formed integrally with the outer surface at the open distal end of the body 4 to run in the circumferential direction.

This type of device is suitable for use in cases where a rotating member or the like is passed through the device along the device axis 1a. This is because the provision of the diaphragm 3 of the flexible external gear so as to extend radially outward from the end of the body 2 facilitates accommodation of the rotating member in the internal space of the body 3.

Recent years have seen increased demand for more compact speed reducing mechanisms for use in small robots and the like. One way of responding to this demand is to shorten the axial length of the silk-hat flexible meshing gear device. For this it is necessary to shorten the axial length of the silk-hat-shaped flexible external gear. In the external gears in general use, the ratio of the axial length of the flexible external gear to the pitch circle diameter of its external teeth is around 1:1. Making the axial length shorter than this increases the coning angle of the external gear.

In other words, the coning angle θ of the flexible external gear 1 increases as shown in FIG. 5. As a result, excessive stress concentration may occur at such points as the inner edge 3a and the outer edge 3b of the diaphragm 3 shown in FIG. 6. It may also become impossible to maintain proper meshing of the external and internal gears. Because of this, a conventional flexible external gear merely shortened in axial length is not useful in practical applications.

In the silk-hat flexible meshing gear device, since, as explained in the foregoing, the diaphragm 3 of the flexible external gear extends radially outward from the end of the body 2, a rotating member or the like can be passed through and accommodated in the internal space of the body 3. However, this radially outward extension of the diaphragm 3 gives the device a larger outer diameter than that of a cup-shaped flexible meshing gear device equipped with a cup-shaped flexible external gear. The outer diameter of the device can be reduced by reducing the outer diameter of the diaphragm 3.

As shown by the arrows in FIG. 6, however, a large bending stress repeatedly acts on the diaphragm 3 owing to deformation of the body 2 flexed in the radial direction by a wave generator (not shown). If the diameter of the diaphragm 3 is reduced, therefore, the stress arising at the inner edge 3a and outer edge 3b of the diaphragm 3 increases in inverse proportion. This leads to undesirable concentration of stress at these inner and outer edge portions.

The applicant therefore earlier proposed a structure for relieving the concentration of stress at the inner edge and outer edge of the diaphragm. This structure, which is disclosed in JU-B 3-118346, is obtained by thinning the diaphragm at its middle portion and thickening it at both edge portions. However, this publication does not propose a specific configuration for achieving the proposed thinning of the thickness at the middle portion of the diaphragm.

In view of the aforesaid point, an object of this invention is to provide a silk-hat flexible meshing gear device wherein stress concentration in the silk-hat-shaped flexible external gear can be relieved and the silk-hat-shaped flexible external gear can be reduced in axial length.

Another object of the invention is to provide a silk-hat flexible meshing gear device wherein stress concentration in the diaphragm is further relieved to enable a reduction in the device outer diameter.

Another object of the invention is to provide a silk-hat flexible meshing gear device wherein stress concentration in the silk-hat-shaped flexible external gear can be relieved and the silk-hat-shaped flexible external gear can be reduced in both axial length and outer diameter.

DISCLOSURE OF THE INVENTION

This invention relates to a silk-hat flexible meshing gear device which has an annular rigid internal gear, a flexible external gear disposed inside the flexible external gear and a wave generator disposed inside the flexible external gear which flexes the external gear in the radial direction to mesh it partially with the rigid internal gear and rotate the meshing position therebetween in the circumferential direction and whose flexible external gear includes a cylindrical body formed with external teeth on its outer surface at one open end, an annular diaphragm whose inner edge is continuous with another open end of the body and an annular boss formed continuously with the outer edge of the diaphragm The invention achieves the aforesaid objects by defining the sectional shape of the flexible external gear in the following manner.

Specifically, the end portion of the body on the diaphragm side is formed with a curved portion curving perpendicularly to the device axis so as to continue into the inner edge of the diaphragm and the portion of the body adjacent to the start of the curved portion is constituted as a thinned portion of less thickness than the portion adjacent thereto.

The thickness of the thinned portion is preferably about 0.8 of that of the adjacent body portion.

Forming the diaphragm side end of the body of the silk-hat flexible meshing gear with the thinned portion in this manner relieves the concentration of stress at the inner edge and outer edge of the diaphragm and results in a smooth overall stress distribution.

In addition, the body length is preferably defined within the approximate range of 0.2–0.7 of the pitch circle diameter of the external teeth of the external gear and the length of the external teeth in the direction of the tooth trace is preferably defined within the approximate range of 0.1–0.3 of the pitch circle diameter of the external teeth. Within these ranges, proper meshing of the external and internal teeth can be maintained despite increase in the coning angle occurring in the flexible external gear.

Further, the sectional shape of the diaphragm of the external gear in a plane including the device axis is preferably defined such that the thickness t(A) at the inner edge is greatest, the thickness t(B) at the portion substantially midway between the inner edge and the outer edge is smallest, and the thickness t(C) at the outer edge falls between the thickness t(A) and t(B), namely, such that t(A)>t(C)>t(B).

In this case, in order to smooth the change in stress distribution from the inner edge of the diaphragm toward the outer edge thereof, it is preferable to define the aforesaid sectional shape of the diaphragm of the external gear such that the contour of at least one surface of the diaphragm is defined by multiple curves to produce a smooth change in thickness.

Studies by the inventors showed that the relationship between the thickness t(A) at the inner edge and the thickness t(B) at the middle portion is preferably defined such that t(A)/t(B) falls in the approximate range of 1.5–2.2.

The relationship between the thickness t(C) at the outer edge and the thickness t(B) at the middle portion is preferably defined such that t(C)/t(B) falls in the approximate range of 1.4–2.0.

Defining the sectional shape of the diaphragm in this manner smooths the stress distribution in the diaphragm of the silk-hat flexible meshing gear from the inner edge toward the outer edge. It also prevents stress concentration at the inner edge and the outer edge. As a result, the outer diameter of the diaphragm can be reduced.

BEST MODE FOR CARRYING OUT THE INVENTION

An embodiment of the invention will be explained with reference to the drawings in the following.

Figure 1:
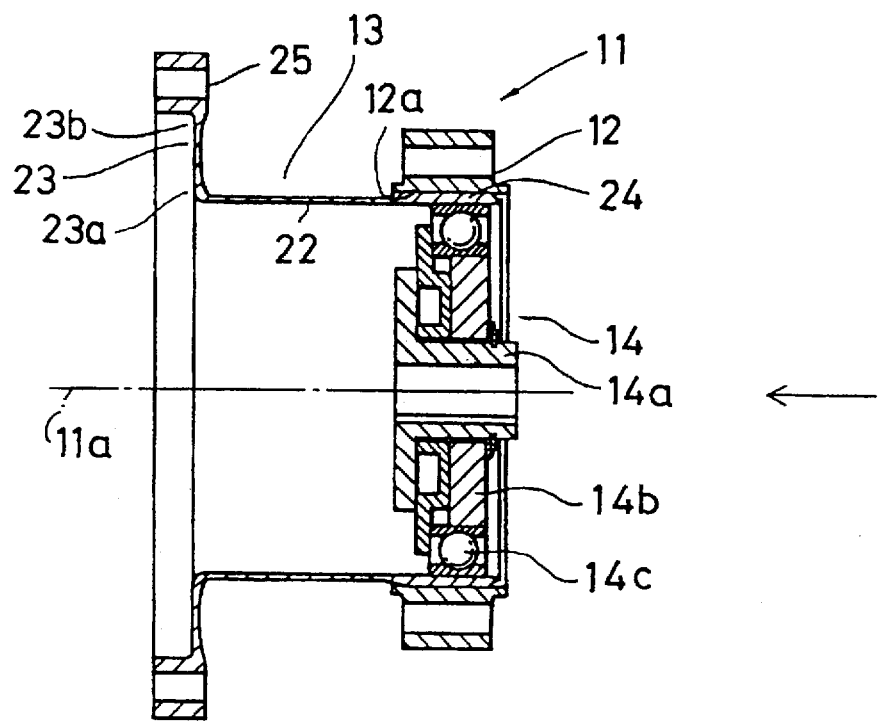
FIG. 1 is schematic sectional view of a silk-hat flexible meshing gear device which is an embodiment of the invention.
Figure 2:
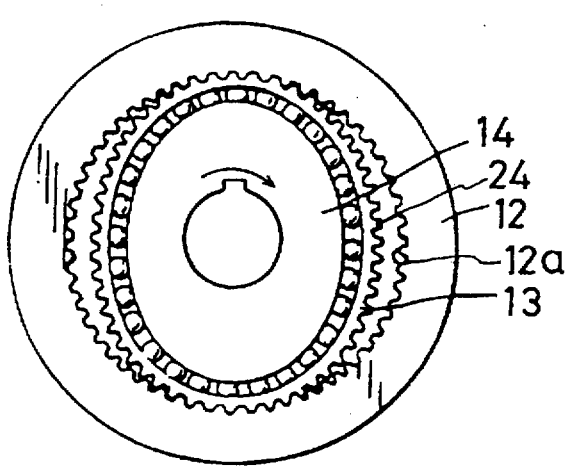
FIG. 2 is a schematic front view of the silk-hat flexible meshing gear device of FIG. 1 seen in the direction of the arrow in FIG. 1.

FIGS. 1 and 2 show the overall configuration of this embodiment of the silk-hat flexible meshing gear device. The device 11 in these figures is constituted of an annular rigid internal gear 12, a silk-hat-shaped flexible external gear 13 located inside the rigid internal gear 12, and an elliptical wave generator 14 fitted inside the flexible external gear 13.

The flexible external gear 13 has a body 22, an annular diaphragm 23 whose inner edge 23a is continuous with the open proximal end of the body 22, and a thick annular boss 25 continuous with the outer edge 23b of the diaphragm 23. External teeth 24 are formed integrally with the outer surface of the open distal end of the body 22 to run in the circumferential direction. The boss 25 is for attaching the device to another object (not shown) so that body 22 and the diaphragm 23 are cantilevered from the boss 25.

The wave generator 14 is constituted of a hollow hub 14a, an elliptical cam plate 14b fitted on the outer surface of the hub 14a, a ball bearing 14c fitted on the outer surface of the cam plate 14b. The wave generator 14 flexes the portion of the body 22 formed with the external teeth 24 of the flexible external gear into elliptical shape. As a result, the external teeth at two portions located at opposite ends of the major axis of the ellipse mesh with inner teeth 12a of the rigid internal gear 12. When the wave generator 14 is rotated about the device axis 11a, the meshing positions rotate in the circumferential direction. This rotation produces a relative rotation between the flexible external gear 13 and the rigid internal gear 12 proportional the difference in the number of external and internal teeth. If, for example, the rigid internal gear 12 is fixed and the wave generator 14 is used as a high-speed rotational input element, the flexible external gear 13 will become a reduced speed output element from which a rotational output of reduced speed can be obtained.

Figure 3:
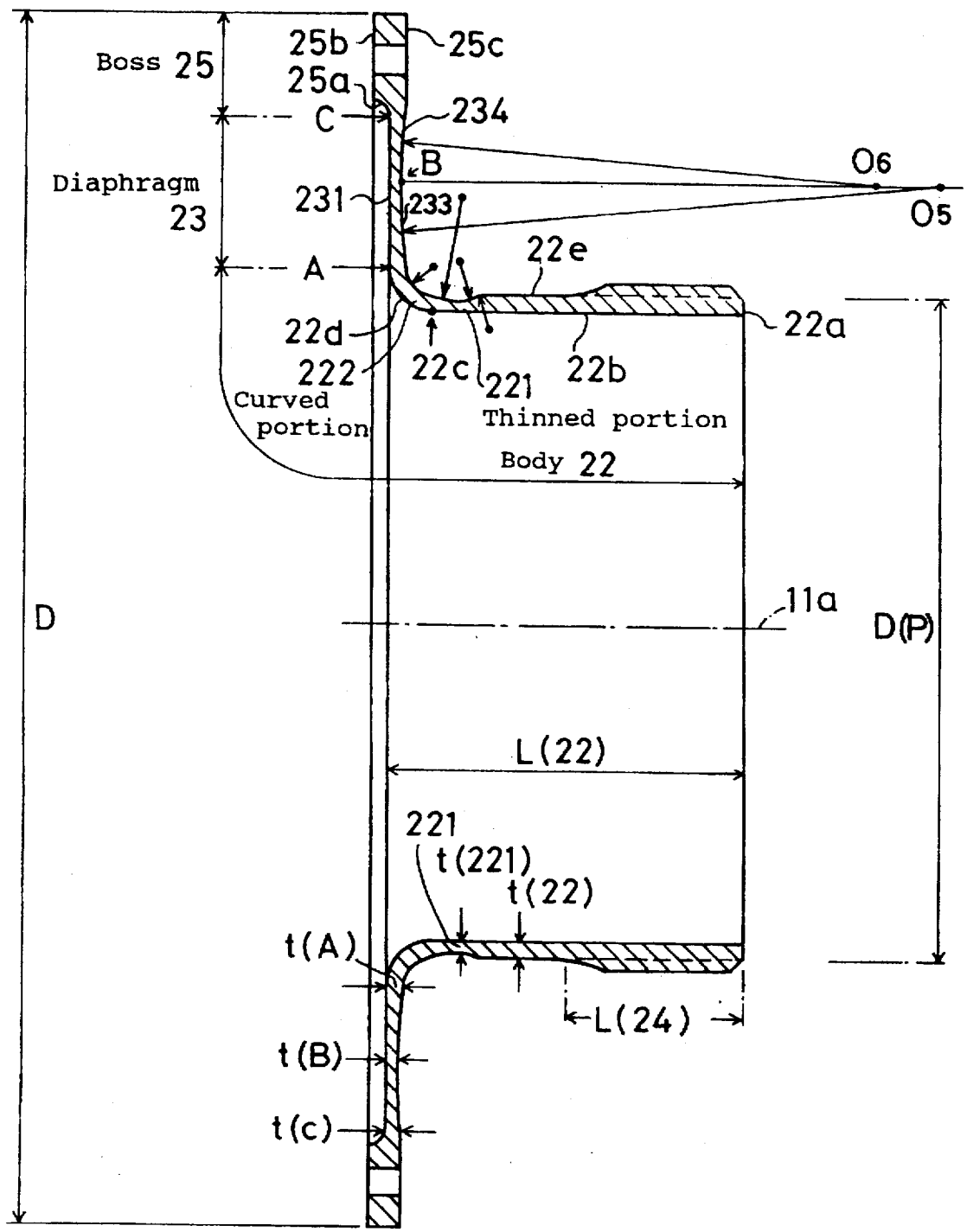
FIG. 3 is a vertical sectional view of a silk-hat-shaped flexible external gear of the device of FIG. 1.
Figure 4:
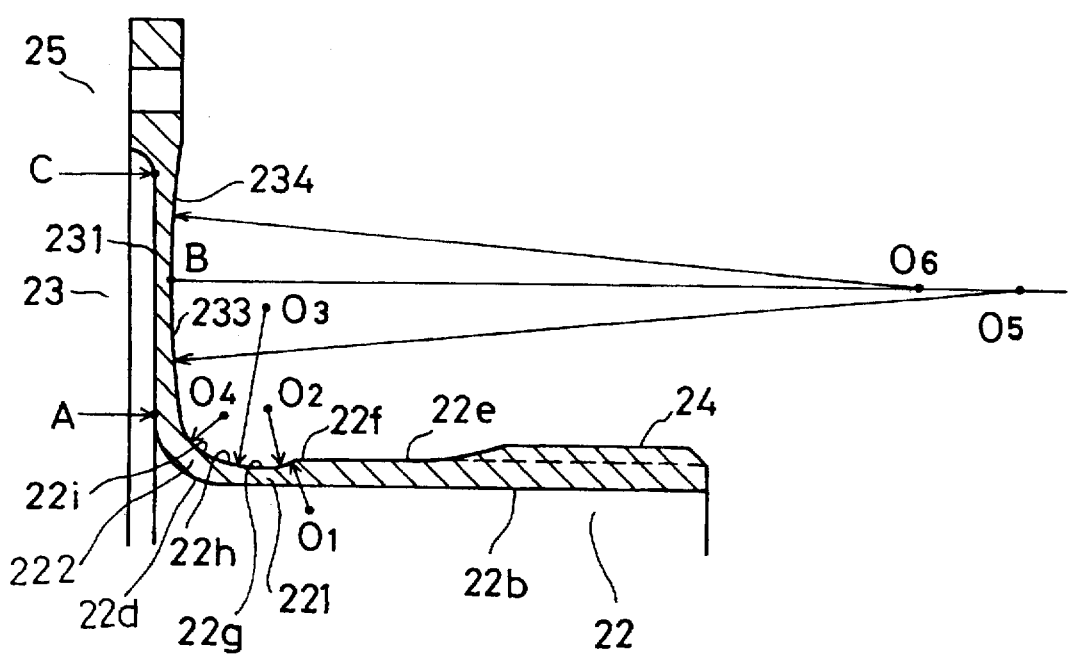
FIG. 4 is an enlarged view of a portion of the vertical section of the external gear shown in FIG. 3.

FIG. 3 is a vertical sectional view of the silk-hat-shaped flexible external gear 13 of the external gear in a plane including the device axis 11a. FIG. 4 is an enlarged view of a portion of the vertical section of the external gear shown in FIG. 3.

The sectional shape of the respective portions as seen in a section taken in a plane including the device axis 11a is follows. Starting from the opening 22a at the distal end of the body 22 of the flexible external gear 13, the inner surface of the body 22 is defined by a straight line 22b lying parallel to the device axis 11a. The point 22c at the proximal end of the straight line 22b connects with an arc 22d continuing smoothly from the straight line 22b. At its other end, indicated as point A, the arc 22d continues smoothly into a straight line 231 lying perpendicular to the device axis 11a and defining the rear surface of the diaphragm 23. At the outer edge indicated by point C, the other end of the straight line 231 continues smoothly into an arc 25a continuous with the rear surface of the boss 25. The other end of the arc 25a connects with a straight line 25b lying perpendicular to the device axis 11a.

The outer surface of the body 22 of the flexible external gear 13 is basically defined by a straight line 22e lying parallel to the straight line 22b of the inner surface. As indicated earlier, the outer surface of the distal end of the body 22 is integrally formed with the external teeth 24. The end of the straight line 22e continues smoothly into a convex arc 22f having its center at ○1. The arc 22f continues smoothly into a concave arc 22g having its center at ○2. The concave arc 22g further continues smoothly into a concave arc 22h of smaller curvature having its center at ○3. The concave arc 22h continues smoothly into a concave arc 22i of larger curvature having its center at ○4. Thus the concave arc 22g forms the proximal end portion of the body 22 with a thinned portion 221 whose thickness is smaller than the thickness t(22) of the body 22 defined by the straight lines 22b, 22e.

The arc 22i continues smoothly into an arc 233 having its center at ○5 and defining the front surface of the diaphragm 23. Near the middle of the diaphragm 23, namely at a point B midway between point A and point C, the arc 233 continues smoothly into an arc 234 of slightly larger curvature having its center at ○6. The other end of the arc 234 continues smoothly into a straight line 25c lying perpendicular to the device axis 11a and defining the front surface of the boss 25. Thus the rear surface of the diaphragm 23 is defined by the straight line 231 and the front surface thereof is defined by the two arcs 233, 234. The two arcs 233, 234 connect at the point B at the middle of the diaphragm 23. The smallest thickness of the diaphragm 23 defined by the straight line and arcs is the thickness t(B) at the middle point B. The greatest thickness is the thickness t(A) at point A at the inner edge of the diaphragm 23. The thickness t(C) at point C at the outer edge of the diaphragm 23 is slightly larger than the thickness t(A).

In the body 22 of this embodiment, therefore, the sectional shape of the main portion of the body 22 is defined by the straight line 22e and the straight line 22b. The portion continuous with this portion is defined by the concave arc 22g and the straight line 22b as the thinned portion 221. In addition, the portion adjacent to the thinned portion 221 is defined as a curved portion 222 defined by the concave arc 22i and the convex arc 22d to be continuous with the inner edge of the diaphragm.

In the flexible meshing gear device 11 of this embodiment, since the body 22 is formed with the thinned portion 221 and the diaphragm 23 is defined to have the sectional shape described in the foregoing, the distribution of the stress produced in the diaphragm 23 during operation is smoother and more uniform than in the prior art. Moreover, the concentration of stress at the inner edge and the outer edge is thoroughly relieved. Since the stress produced in the diaphragm 23 can be reduced in this way, the length L(22) of the body 22 can be shortened. The outer diameter of the diaphragm 23 can also be made smaller than in the prior art. In other words, the outer diameter of the device indicated as D in FIG. 3 can be reduced.

While the thinned portion 221 is formed on the outer surface of the body 22 in this embodiment, it is possible instead to form a similar thinned portion on the inner surface of the body 22 or to form a thinned portion by defining both the outer surface and the inner surface with concave lines.

Tests and the like conducted by the inventors showed that the thickness t(221) of the thinned portion 221 of the body 22 is preferably set at about 80% of the thickness t(22) of the body 22.

On the other hand, tests conducted by the inventors showed that when the thicknesses at point A and point C are set within the following ranges relative to the smallest thickness t(B), the stress distribution becomes smooth between the inner edge and the outer edge of the diaphragm 23 and the concentration of stress at the inner edge and the outer edge is relieved.

$1.5 < t(A)/t(B) < 2.2$ $1.4 < t(C)/t(B) < 2.0$

In this embodiment, two arcs 233, 234 are used to define the thickness of the diaphragm 23. However, it is also possible to use three or more arcs to define the thickness of the diaphragm 23. While the rear surface of the diaphragm 23 is defined by the straight line 231, it can instead be defined by curved lines and the front surface be defined by a straight line. It is also possible to define a sectional shape satisfying the aforesaid conditions by defining both surfaces of the diaphragm 23 with curved lines.

The coning of the flexible external gear 13 in the silk-hat flexible meshing gear device 11 will now be considered. The flexible external gear 13 is repeatedly flexed into elliptical shape by the wave generator 14 fitted therein. To reduce the coning force acting on the ball bearing 14c of the wave generator 14 as a result of this deformation, i.e. coning, it is preferable to shorten the length (tooth length) L(24) of the external teeth 24 in the tooth trace direction. When the tooth length L(24) is shortened, the axial length L(22) of the body 22 can also be shortened by a corresponding amount. In other words, a flexible meshing gear device of short axial length can be realized.

Figure 5:
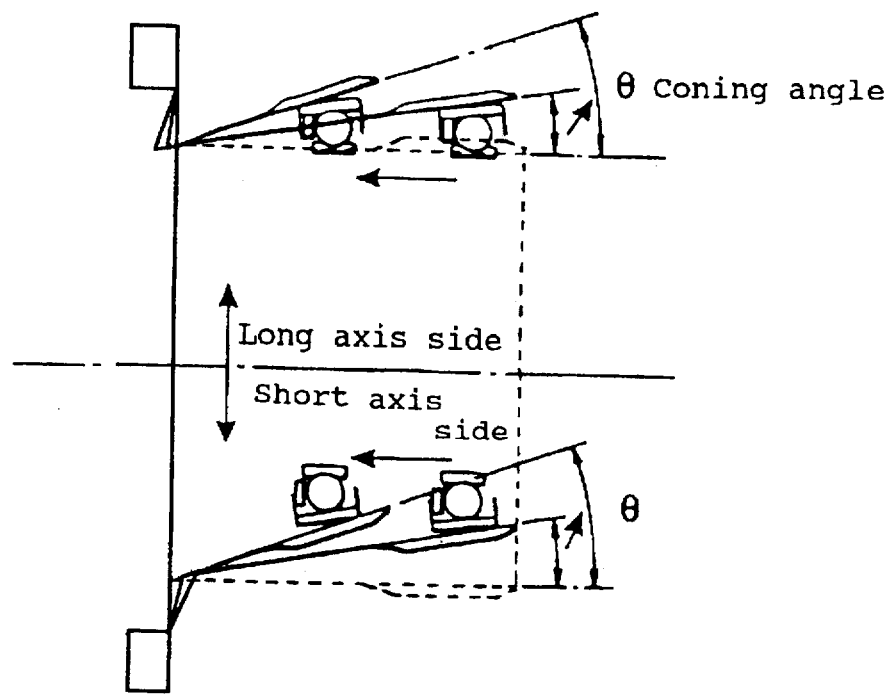
FIG. 5 is a diagram for explaining increase in coning angle caused by reducing the axial length of the flexible external gear.
Figure 6:
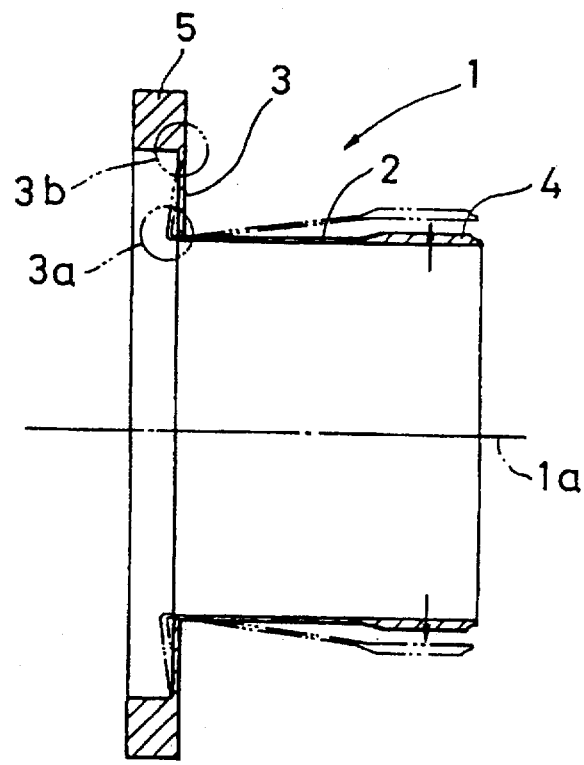
FIG. 6 is a diagram for explaining a problem of the conventional silk-hat flexible meshing gear device.

When the axial length is shortened, however, the coning angle θ of the flexible external gear 13 increases as shown in FIG. 5. As a result, increased stress is produced in the diaphragm 23.

It has been found, however, that when the thicknesses of the different portions of the flexible external gear 13 are defined as in the device 11 of the embodiment described in the foregoing, excessive stress concentration does not arise and a smooth distribution of the produced stress can be achieved even if the axial length is shortened.

Tests and the like conducted by the inventors showed that the length L(22) of the body 22 of the flexible external gear 13 is preferably set in the approximate range of 20–70% of the opening diameter of the external teeth, namely the pitch circle diameter D(P) of the external teeth. It was further found that from the practical viewpoint the length L(24) of the external teeth in the tooth trace direction should preferably be set in the approximate range of 10–30% of the pitch circle diameter P(D).

INDUSTRIAL APPLICABILITY

As explained in the foregoing, in the silk-hat flexible meshing gear device according to this invention, the end of the body of the silk-hat-shaped flexible external gear on the side of the diaphragm is formed with a curved portion curving perpendicularly to the device axis so as to continue smoothly into the inner edge of the diaphragm and the portion of the body adjacent to the start of the curved portion is constituted as a thinned portion of less thickness than the portion adjacent thereto. Forming the thinned portion at this location relieves the concentration of stress at the inner edge and outer edge of the diaphragm and results in a smooth overall stress distribution. As a result, it is possible to use a shorter flexible external gear than in the past.

The body length is set within the approximate range of 0.2–0.7 of the pitch circle diameter of the external teeth of the external gear and the length of the external teeth in the direction of the tooth trace is set within the approximate range of 0.1–0.3 of the pitch circle diameter of the external teeth. As a result, proper meshing of the external and internal teeth can be maintained despite increase in the coning angle of the flexible external gear.

In the silk-hat flexible meshing gear device according to the invention, the thickness of the diaphragm of the silk-hat-shaped flexible external gear is defined such that the middle portion is thinnest, the inner edge is thickest and the outer edge is thinner than the inner edge but thicker than the middle portion and such that this thickness pattern is obtain by smooth thickness variation from the inner edge to the outer edge.

In accordance with this invention, therefore, concentration of stress at the inner edge and the outer edge of the diaphragm can be relieved and distribution of the stress produced in the diaphragm can be made uniform. As a result, the outer diameter of the diaphragm can also be made smaller than in the prior art. Moreover, since excessive concentration of stress at the inner and outer edges of the diaphragm can be avoided even if the length of the body is shortened, a flexible external gear of short axial length can be realized.

We claim:

1. A silk-hat flexible meshing gear device which has an annular rigid internal gear, a flexible external gear disposed inside the rigid internal gear and a wave generator disposed inside the flexible external gear which flexes the external gear in a radial direction to partially mesh it with the rigid internal gear and rotate a meshing position therebetween in a circumferential direction and whose flexible external gear includes a cylindrical body formed with external teeth on its outer surface at one open end, an annular diaphragm whose inner edge is continuous with another open end of the body and an annular boss formed continuously with an outer edge of the diaphragm, characterized in that the end of the body of the flexible external gear on the diaphragm side is formed with a curved portion curving perpendicularly to a device axis so as to continue smoothly into the inner edge of the diaphragm and a portion of the body adjacent to the start of the curved portion is constituted as a thinned portion of less thickness than a portion adjacent thereto.

2. A silk-hat flexible meshing gear device according to claim 1, wherein the thickness of the thinned portion is set at about 0.8 of the thickness of the adjacent portion of the body.

3. A silk-hat flexible meshing gear device according to claim 1, wherein the body has a length set within an approximate range of 0.2–0.7 of a pitch circle diameter of the external teeth of the flexible external gear.

4. A silk-hat flexible meshing gear device according to claim 1, wherein the external teeth have a length in a tooth trace direction set within an approximate range of 0.1–0.3 of the pitch circle diameter of the external teeth.

5. A silk-hat flexible meshing gear device according to claims 1, wherein a sectional shape of the diaphragm of the flexible external gear in a plane including a device axis is defined such that a thickness $t(A)$ at the inner edge is greatest, a thickness $t(B)$ at a portion substantially midway between the inner edge and the outer edge is smallest, and a thickness $t(C)$ at the outer edge falls between the thickness $t(A)$ and $t(B)$, namely, such that $t(A)>t(C)>t(B)$.

6. A silk-hat flexible meshing gear device according to claim 5, wherein the sectional shape of the diaphragm of the flexible external gear in a plane including the device axis is such that a contour of at least one surface of the diaphragm is defined by multiple curves to produce a smooth increase in thickness from the middle portion toward the inner edge and the outer edge.

7. A silk-hat flexible meshing gear device according to claim 5, wherein a relationship between the thickness $t(A)$ at the inner edge and the thickness $t(B)$ at the middle portion is defined such that $t(A)/t(B)$ falls in an approximate range of 1.5–2.2.

8. A silk-hat flexible meshing gear device according to claim 5, wherein a relationship between the thickness $t(C)$ at the outer edge and the thickness $t(B)$ at the middle portion is defined such that $t(C)/t(B)$ falls in an approximate range of 1.4–2.0.

9. A silk-hat flexible meshing gear device which has an annular rigid internal gear, a flexible external gear disposed inside the rigid internal gear and a wave generator disposed inside the flexible external gear which flexes the external gear in a radial direction to partially mesh it with the rigid internal gear and rotate a meshing position therebetween in a circumferential direction and whose flexible external gear includes a cylindrical body formed with external teeth on its outer surface at one open end, an annular diaphragm whose inner edge is continuous with another open end of the body and an annular boss formed continuously with an outer edge of the diaphragm, characterized in that a sectional shape of the diaphragm of the flexible external gear in a plane including a device axis is defined such that a thickness $t(A)$ at the inner edge is greatest, a thickness $t(B)$ at a portion substantially midway between the inner edge and the outer edge is smallest, and a thickness $t(C)$ at the outer edge falls between the thickness $t(A)$ and $t(B)$, namely, such that $t(A)>t(C)>t(B)$.

10. A silk-hat flexible meshing gear device according to claim 9, wherein the sectional shape of the diaphragm of the flexible external gear in a plane including the device axis is such that a contour of at least one surface of the diaphragm is defined by multiple curves to produce a smooth increase in thickness from the middle portion toward the inner edge and the outer edge.

11. A silk-hat flexible meshing gear device according to claim 9, wherein a relationship between the thickness $t(A)$ at the inner edge and the thickness $t(B)$ at the middle portion is defined such that $t(A)/t(B)$ falls in an approximate range of 1.5–2.2.

12. A silk-hat flexible meshing gear device according to claim 9, wherein a relationship between the thickness $t(C)$ at the outer edge and the thickness $t(B)$ at the middle portion is defined such that $t(C)/t(B)$ falls in an approximate range of 1.4–2.0.

* * * * *